(12) United States Patent
Koseoglu

(10) Patent No.: US 11,066,607 B1
(45) Date of Patent: Jul. 20, 2021

(54) PROCESS FOR PRODUCING DEASPHALTED AND DEMETALLIZED OIL

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/852,350

(22) Filed: Apr. 17, 2020

(51) Int. Cl.
C10G 53/08 (2006.01)

(52) U.S. Cl.
CPC ..... *C10G 53/08* (2013.01); *C10G 2300/1077* (2013.01); *C10G 2300/205* (2013.01); *C10G 2300/4081* (2013.01); *C10G 2300/44* (2013.01)

(58) Field of Classification Search
USPC ........................................ 208/309
See application file for complete search history.

(56) References Cited

U.S. PATENT DOCUMENTS

| | | | |
|---|---|---|---|
| 2,191,972 A | 2/1940 | Ocon | |
| 2,337,448 A | 12/1942 | Carr | |
| 2,378,762 A | 6/1945 | Frey | |
| 2,783,188 A | 2/1957 | Agoston | |
| 2,859,171 A | 11/1958 | Fahnestock | |
| 3,227,645 A | 1/1966 | Frumkin et al. | |
| 3,334,043 A | 8/1967 | Ferris et al. | |
| 4,239,616 A | 12/1980 | Gearhart | |
| 4,290,880 A | 9/1981 | Leonard | |
| 4,305,814 A | 12/1981 | Leonard | |
| 4,419,219 A | 12/1983 | Long et al. | |
| 4,482,453 A | 11/1984 | Coombs et al. | |
| 4,486,298 A * | 12/1984 | Bowes ................. | C10G 25/003 208/253 |
| 4,502,944 A | 3/1985 | Nelson | |
| 4,572,781 A | 2/1986 | Krasuk et al. | |
| 4,663,028 A | 5/1987 | Ditman | |
| 4,747,936 A | 5/1988 | Penning | |
| 4,810,367 A | 3/1989 | Chombate et al. | |
| 4,816,140 A | 3/1989 | Trambouze et al. | |

(Continued)

OTHER PUBLICATIONS

Ikyereve et al., "Selective Removal of Metal Ions from Crude Oil Using Synthetic Zeolites," International Journal of Scientific and Research Publications, 4:5:13, May 2014.

(Continued)

*Primary Examiner* — Nina Bhat
(74) *Attorney, Agent, or Firm* — Abelman, Frayne & Schwab

(57) ABSTRACT

A process and system for producing deasphalting and demetallized oil from an initial feed such as a heavy feed is provided. The feed is contacted with an effective quantity of solvent to promote phase separation, to produce an asphalt phase and a reduced asphalt content phase. The reduced asphalt content phase is contacted with an effective amount of solid adsorbent to remove undesirable metal compounds to produce an oil phase substantially-free of asphalt and substantially-free of metal. The oil phase that is substantially-free of asphalt and substantially-free of metal is subjected to flash separation to produce a solvent fraction for recycle and an oil phase effluent substantially-free of asphalt and substantially-free of metal for recovery as the desired product.

20 Claims, 4 Drawing Sheets

(56) References Cited

U.S. PATENT DOCUMENTS

| | | | |
|---|---|---|---|
| 7,384,537 B2 * | 6/2008 | Nagamatsu | C10G 65/12 |
| | | | 208/108 |
| 7,566,394 B2 * | 7/2009 | Koseoglu | C10G 21/003 |
| | | | 208/309 |
| 7,799,211 B2 * | 9/2010 | Koseoglu | C10G 25/11 |
| | | | 208/250 |
| 7,967,976 B2 * | 6/2011 | Silva | C10G 25/003 |
| | | | 208/252 |
| 8,790,508 B2 | 7/2014 | Koseoglu et al. | |
| 8,951,410 B2 | 2/2015 | Koseoglu et al. | |
| 9,315,733 B2 * | 4/2016 | Koseoglu | C10C 3/00 |
| 9,909,068 B2 * | 3/2018 | Koseoglu | C10B 57/045 |
| 9,994,780 B2 * | 6/2018 | Koseoglu | C10B 57/08 |
| 10,125,319 B2 * | 11/2018 | Koseoglu | C10G 1/00 |
| 10,233,394 B2 * | 3/2019 | Koseoglu | C01B 32/05 |
| 2006/0175229 A1 * | 8/2006 | Montanari | C10G 67/049 |
| | | | 208/49 |
| 2015/0014217 A1 * | 1/2015 | Smiley | C10G 45/16 |
| | | | 208/59 |
| 2017/0190990 A1 * | 7/2017 | Koseoglu | C10G 27/12 |
| 2017/0306240 A1 * | 10/2017 | Koseoglu | C10G 21/003 |

OTHER PUBLICATIONS

Al-Hajji, et al., "Trace Metal Speciation of Crude Oil Fractions," Prep.Pap-Am. Chem. Soc., DIV.Fuel Chem. 53(2):2009.

\* cited by examiner

PROCESS FOR PRODUCING DEASPHALTED AND DEMETALLIZED OIL

RELATED APPLICATIONS

Not applicable.

BACKGROUND OF THE INVENTION

Field of the Invention

This present invention relates to a process for producing deasphalted and demetallized oil, in particular an integrated process including extraction and adsorption to reduce the metal content.

Description of Related Art

Metal content in refinery feedstocks detrimentally impacts process efficiency. Metals are mostly concentrated in residue fractions, typically in the form of metal porphyrins. These metals are also found in low concentration in vacuum gas oil fractions. The most abundant and problematic metals in crude oils and its fractions are nickel and vanadium, which are present in amounts ranging from a few ppmw to over 1,000 ppmw.

Unlike other heteroatoms, such as sulfur and nitrogen which can be removed as gaseous products after hydroprocessing, metals remain and tend to accumulate on the hydrotreating catalysts, typically as metal sulfides deposits. Accordingly, metals have irreversible poisoning effect on the life of the refining catalysts. In some processes, such as fluidized catalytic cracking (FCC), the presence of metals can impact the catalyst activity and change the product selectivity toward the production of undesirable products, such as coke and gas, at the expense of desirable gasoline product. The presence of metals also negatively impacts performance of high temperature power generators and oil fired turbines. Further, the presence of metallic components, such as vanadium, can lead to ash deposits.

Most metals in the crude oils are chelated with porphyrins. Some are reported to be chelated with ligands that are not porphyrinic. Typical vanadyl and nickel porphyrin structures are given below:

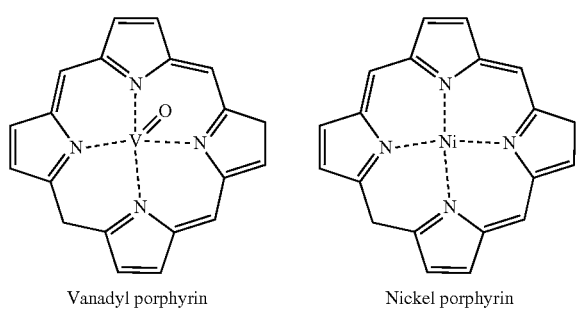

Vanadyl porphyrin    Nickel porphyrin

Further information pertaining to metal content in crude oil fractions is found in Adnan Al-Hajji and Omer R. Koseoglu, "Trace Metal Speciation of Crude Oil Fractions," Preprint Am. Chem. Soc., Div. Fuel Chem. 2009, 53 (2) (submitted before the 238th ACS National Meeting, August 2009), which is incorporated by reference herein in its entirety.

Solvent deasphalting (SDA) is used for production of deasphalted oil (DAO), and serves to demetallize residual streams to a certain extent. However, additional steps are required for complete demetallization to produce demetallized oil (DMO), including high pressure hydrodemetallization, a costly step in terms of requisite hydrogen and catalyst requirements. Therefore, a need exists for improved processes to reduce the metal content of refinery feedstreams.

SUMMARY

The present disclosure provides systems and processes for producing a deep demetallized oil (DDMO) product, utilizing a modified solvent deasphalting operation and an adsorbent treatment operation.

In one embodiment, an enhanced solvent deasphalting/demetallizing (SDA/DM) system herein includes a primary phase separation zone, a secondary phase separation zone, an adsorptive demetallizing zone, a deasphalted/demetallized oil separation zone, and an asphalt separation zone. The adsorptive demetallizing zone is positioned and arranged between the secondary phase separation zone and the DDMO separation zone, so that a mixture of DAO oil and solvent from the secondary phase separation zone is passed to the adsorptive demetallizing zone. A corresponding embodiment of a method to produce DDMO comprises: mixing the feedstock with an effective quantity of paraffinic solvent, extracting asphaltic content, and recovering a mixture of deasphalted oil and paraffinic solvent, in a primary phase separation zone and a secondary phase separation zone; contacting the mixture of deasphalted oil and paraffinic solvent with adsorbent; and recovering a mixture of deeply demetallized oil and paraffinic solvent.

In another embodiment, an enhanced SDA/DM system herein includes a phase separation zone, an adsorptive demetallizing zone, a DDMO separation zone and an asphalt separation zone. The adsorptive demetallizing zone is positioned and arranged between the phase separation zone and the DDMO separation zone, so that a mixture of DAO and solvent from the phase separation zone is passed to the adsorptive demetallizing zone. A corresponding embodiment of a method to produce DDMO comprises: mixing the feedstock with an effective quantity of paraffinic solvent; extracting asphaltic content; recovering a mixture of deasphalted oil and paraffinic solvent; contacting the mixture of deasphalted oil and paraffinic solvent with adsorbent; and recovering a mixture of deeply demetallized oil and paraffinic solvent.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1:
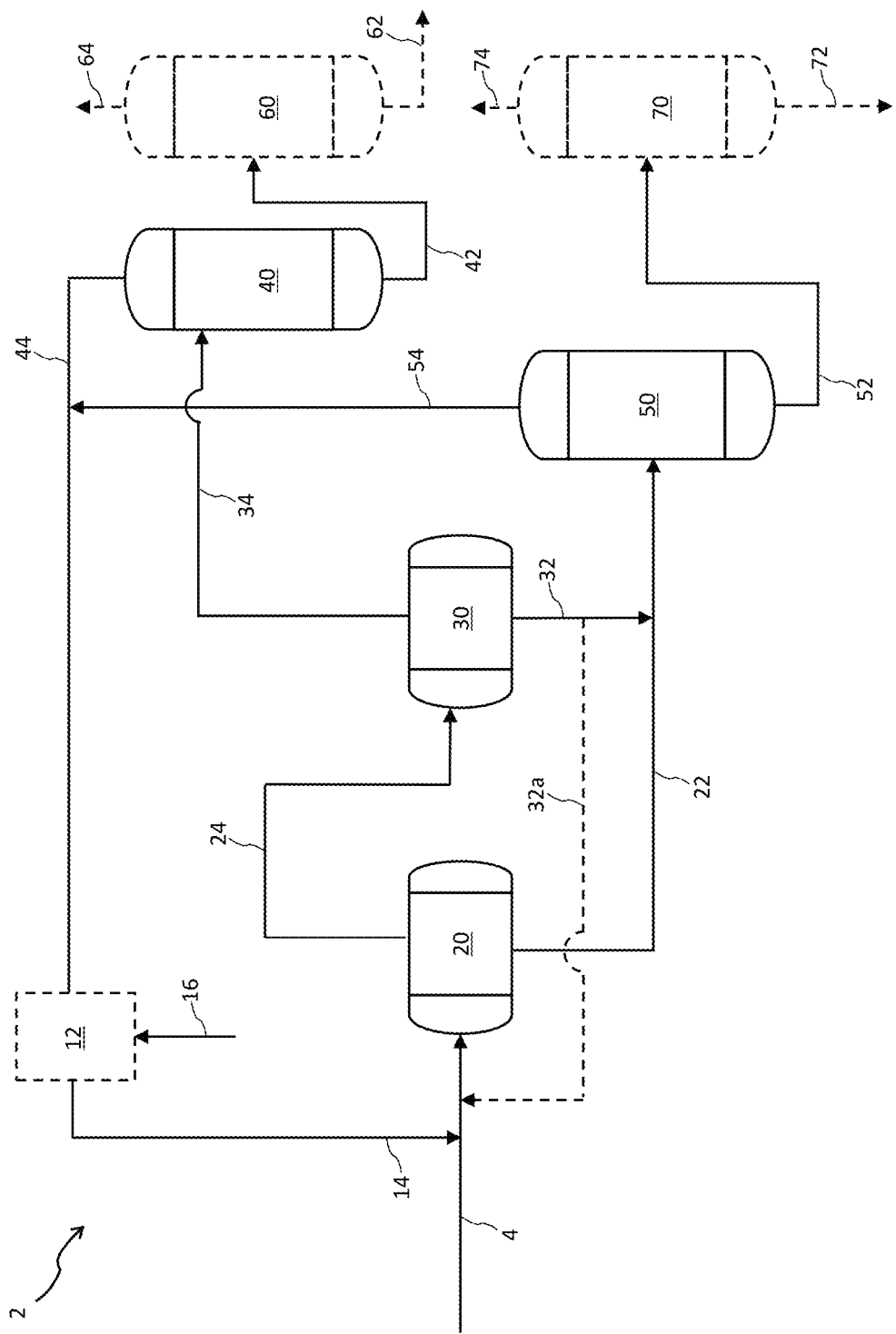
FIG. 1 is a process flow diagram of a conventional SDA unit operation.

The processes herein adapt SDA or enhanced SDA processes for additional removal of metal constituents of heavy feedstocks. For example, the vacuum residue streams can have a metal content in the range of 50-2,000 ppmw or more, depending upon the source of the crude oil and the residue cut point. Demetallized oil effluent from commercially available demetallization unit operations (such as a DEMEX unit commercially available from UOP) have metal contents, for instance, less than 10 ppmw. Additional treatment of that demetallized oil is often required to lower the metal content to desirable levels, for instance, less to than 0.5 ppmw, so that those feeds can effectively be used in downstream units without catalyst poisoning and other detrimental effects.

The processes herein are suitable for removal of refractory metal compounds such as metalloporphyrins, including vanadyl and nickel porphyrin, and produce a demetallized oil product of very low metal content. For example, vacuum residue having an initial content of 50-2,000 ppmw Ni and V can be demetallized according to the enhanced solvent deasphalting processes to produce a DDMO product having Ni and V levels at or below 5, 1 or 0.5 ppmw.

In one embodiment, an enhanced solvent deasphalting/demetallizing system is provided for production of DDMO. The system includes a primary phase separation zone, a secondary phase separation zone, an adsorptive demetallizing zone, a DDMO separation zone, optionally an associated steam stripper, and an asphalt separation zone and optionally an associated steam stripper. The adsorptive demetallizing zone is positioned and arranged between the secondary phase separation zone and the DDMO separation zone, so that a mixture of DAO and solvent from the secondary phase separation zone is passed to the adsorptive demetallizing zone.

In another embodiment, an enhanced solvent deasphalting/demetallizing system includes a phase separation zone, an adsorptive demetallizing zone, a DDMO separation zone, optionally an associated steam stripper, and an asphalt separation zone and optionally an associated steam stripper. The adsorptive demetallizing zone is positioned and arranged between the phase separation zone and the DDMO separation zone, so that a mixture of deasphalted oil and solvent from the phase separation zone is passed to the adsorptive demetallizing zone.

As used herein, volume percent or "V %" refers to a relative at conditions of 1 atmosphere pressure and 15° C.

The phrase "a major portion" with respect to a particular stream or plural streams, or content within a particular stream, means at least about 50 V % and up to 100 V %, or the same values of another specified unit.

The phrase "a significant portion" with respect to a particular stream or plural streams, or content within a particular stream, means at least about 75 V % and up to 100 V %, or the same values of another specified unit.

The phrase "a substantial portion" with respect to a particular stream or plural streams, or content within a particular stream, means at least about 90, 95, 98 or 99 V % and up to 100 V %, or the same values of another specified unit.

The phrase "a minor portion" with respect to a particular stream or plural streams, or content within a particular stream, means from about 1, 2, 4 or 10 V %, up to about 20, 30, 40 or 50 V %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 42° or 44°.

The acronym "LPG" as used herein refers to the well-known acronym for the term "liquefied petroleum gas," and generally is a mixture of C3-C4 hydrocarbons. In certain embodiments, these are also referred to as "light ends."

The term "naphtha" as used herein refers to hydrocarbons boiling in the range of about 20-205, 20-193, 20-190, 20-180, 20-170, 32-205, 32-193, 32-190, 32-180, 32-170, 36-205, 36-193, 36-190, 36-180 or 36-170° C.

The term "light naphtha" as used herein refers to hydrocarbons boiling in the range of about 20-110, 20-100, 20-90, 20-88, 20-80, 32-110, 32-100, 32-90, 32-88, 32-80, 36-110, 36-100, 36-90, 36-88 or 36-80° C.

The term "heavy naphtha" as used herein refers to hydrocarbons boiling in the range of about 80-205, 80-193, 80-190, 80-180, 80-170, 88-205, 88-193, 88-190, 88-180, 88-170, 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C.

The term "middle distillates" as used herein relative to effluents from the atmospheric distillation unit or flash zone refers to hydrocarbons boiling in the range of about 170-370, 170-360, 170-350, 170-340, 170-320, 180-370, 180-360, 180-350, 180-340, 180-320, 190-370, 190-360, 190-350, 190-340, 190-320, 193-370, 193-360, 193-350, 193-340, 193-320, 205-370, 205-360, 205-350, 205-340 or 205-320° C.

The term "kerosene" as used herein refers to hydrocarbons boiling in the range of about 170-280, 170-270, 170-260, 180-280, 180-270, 180-260, 190-280, 190-270, 190-260, 193-280, 193-270 or 193-260° C.

The term "light kerosene" as used herein refers to hydrocarbons boiling in the range of about 170-250, 170-235, 170-230, 170-225, 180-250, 180-235, 180-230, 180-225, 190-250, 190-235, 190-230 or 190-225° C.

The term "heavy kerosene" as used herein refers to hydrocarbons boiling in the range of about 225-280, 225-270, 225-260, 230-280, 230-270, 230-260, 235-280, 235-270, 235-260 or 250-280° C.

The term "atmospheric gas oil" and its acronym "AGO" as used herein refer to hydrocarbons boiling in the range of about 250-370, 250-360, 250-340, 250-320, 260-370, 260-360, 260-340, 260-320, 270-370, 270-360, 270-340 or 270-320° C.

The term "heavy atmospheric gas oil" and its acronym "H-AGO" as used herein in certain embodiments refer to the heaviest cut of hydrocarbons in the AGO boiling range including the upper 3-30° C. range (e.g., for AGO having a range of about 250-360° C., the range of H-AGO includes an initial boiling point from about 330-357° C. and an end boiling point of about 360° C.).

The term "medium atmospheric gas oil" and its acronym "M-AGO" as used herein in certain embodiments in conjunction with H-AGO to refer to the remaining AGO after H-AGO is removed, that is, hydrocarbons in the AGO boiling range excluding the upper about 3-30° C. range (e.g., for AGO having a range of about 250-360° C., the range of M-AGO includes an initial boiling point of about 250° C. and an end boiling point of from about 330-357° C.).

In certain embodiments, the term "diesel" is used with reference to a straight run fraction from the atmospheric distillation unit. In embodiments in which this terminology is used, the diesel fraction refers to medium AGO range hydrocarbons and in certain embodiments also in combination with heavy kerosene range hydrocarbons.

The term "atmospheric residue" and its acronym "AR" as used herein refer to the bottom hydrocarbons having an initial boiling point corresponding to the end point of the AGO range hydrocarbons, and having an end point based on the characteristics of the crude oil feed.

The term "vacuum gas oil" and its acronym "VGO" as used herein refer to hydrocarbons boiling in the range of about 370-550, 370-540, 370-530, 370-510, 400-550, 400-540, 400-530, 400-510, 420-550, 420-540, 420-530 or 420-510° C.

The term "light vacuum gas oil" and its acronym "LVGO" as used herein refer to hydrocarbons boiling in the range of about 370-425, 370-415, 370-405, 370-395, 380-425, 390-425 or 400-425° C.

The term "heavy vacuum gas oil" and its acronym "HVGO" as used herein refer to hydrocarbons boiling in the range of about 425-550, 425-540, 425-530, 425-510, 450-550, 450-540, 450-530 or 450-510° C.

The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined above that is derived directly from the atmospheric distillation unit, optionally subjected to steam stripping, as is well known.

The term "asphaltenes" is used as is commonly known, and includes stacked layers of aromatics compounds. Asphaltenes are the brown to black powdery material produced by treatment of petroleum, petroleum residua, or bituminous materials with a low-boiling liquid hydrocarbon, e.g., pentane or heptane; soluble in benzene (and other aromatic solvents), carbon disulfide, and chloroform (or other chlorinated hydrocarbon solvents). Asphaltenes are organic materials consisting of aromatic and naphthenic ring compounds containing nitrogen, sulfur, oxygen and metal porphin molecules.

The term "resins" is used as is commonly known, and refers to large and complex polymeric and aromatic molecules that are smaller than asphaltenes and that also can contain undesirable metals but much less than asphaltenes, and can refer to the heavy portion of the maltenes that is adsorbed by a surface-active material such as clay or alumina, and/or the fraction of deasphalted oil.

For convenience a typical solvent deasphalting is shown and described with reference to FIG. 1, where a residual feed is separated by polarity, instead of by boiling point, as in distillation processes. The solvent deasphalting process produces a low contaminant and reduced asphaltenes product, known conventionally as DAO. These fractions can then be further processed in known conversion units such as FCC and/or hydrocracking units. The SDA process is usually carried out with paraffinic $C_3$-$C_7$ solvents at or below critical conditions.

For instance, FIG. 1 depicts a typical SDA system 2 which generally includes a primary phase separation zone 20, a secondary phase separation zone 30, a DAO separation zone 40 and an asphalt separation zone 50. The primary phase separation zone 20 includes one or more inlets for receiving a heavy feedstock 4 and solvent 14, which can comprise make-up solvent 16, recycle solvent stream 44, and/or recycle solvent stream 54. In certain embodiments, a solvent drum 12 is integrated (shown in dashed lines) to receive the sources of recycle solvent 44, 54 and make-up solvent 16 in the solvent deasphalting system. The primary phase separation zone 20 also includes one or more outlets for discharging an asphalt phase 22, and one or more outlets for discharging a reduced asphalt content phase 24, which is the primary DAO phase. The secondary phase separation zone 30 includes one or more inlets in fluid communication with the primary DAO phase 24 outlet, and one or more outlets for discharging an asphalt phase 32, all or a portion of which can optionally be in fluid communication with an inlet of the primary phase separation zone 20 via line 32a (shown in dashed lines). The secondary phase separation zone 30 also includes one or more outlets for discharging a secondary DAO phase 34 in fluid communication with a DAO inlet of separation zone 40. The separation zone 40 includes one or more outlets for discharging a recycle solvent stream 44, which is in fluid communication with an inlet of the primary phase separation zone 20, and one or more outlets for discharging DAO product 42. The asphalt streams outlets 22, 32 are in fluid communication with one or more inlets of the separation zone 50 for solvent recovery. The separation zone 50 also includes one or more outlets for discharging a recycle solvent stream 54, which is in fluid communication with an inlet of the primary phase separation zone 20, and one or more outlets for discharging asphalt 52. In certain optional embodiments, a steam stripper 60 is included for steam stripping of the solvent from the DAO, including one or more inlets in fluid communication with the deasphalted oil outlet 42, one or more outlets for discharging solvent 64, and one or more outlets for discharging steam stripped DAO 62. Further, in optional embodiments, a steam stripper 70 is included for steam stripping of the solvent from the asphalt 52, including one or more inlets in fluid communication with the asphalt outlet 52, one or more outlets for discharging solvent 74, and one or more outlets for discharging steam stripped asphalt 72.

The feed is mixed with the solvent so that the DAO oil is solubilized in the solvent. The insoluble pitch precipitates out of the mixed solution. Separation of the DAO phase (solvent-DAO mixture) and the pitch phase typically occurs in an extractor designed to efficiently separate the two phases and minimize contaminant entrainment in the DAO phase. The DAO phase is then heated to conditions at which the solvent becomes supercritical. Under these conditions, the separation of the solvent and DAO is relatively easy in a DAO separator. Any entrained solvent in the DAO phase and the pitch phase is stripped out, typically with a low pressure steam stripping apparatus. Recovered solvent is condensed and combined with solvent recovered under high pressure from the DAO separator. The solvent is then recycled back to be mixed with the feed. In typical solvent deasphalting operations, paraffinic solvent is substantially recycled.

SDA is typically carried-out in liquid phase and thus the temperature and pressure are set accordingly. There are generally two stages for phase separation in solvent deasphalting. In a first separation stage, the temperature is maintained at a lower level than the temperature in the second stage to separate the bulk of the asphaltenes. The second stage temperature is carefully selected to control the final DAO quality and quantity. Increasing the extraction temperature can result in decreased yields, but increases the product quality since the heavier compounds are less soluble in the solvent.

Operating conditions for solvent deasphalting units are generally based on a specific solvent and charge stock to produce a DAO of a specified yield and quality. Therefore, the extraction temperature is essentially fixed for a given solvent, and only small adjustments are typically made to maintain the DAO quality. The composition of the solvent is also an important process variable. The solubility of the solvent increases with increasing critical temperature, such that C3<iC4<nC4<iC5, that is, the solubility of iC5 is greater than that of nC4, which is greater than that of iC4, which is greater than that of C3. Solvent deasphalting units are operated at pressures that are high enough to maintain the solvent in the liquid phase, and are generally fixed and vary with solvent composition.

The volumetric ratio of the solvent to the solvent deasphalting unit charge is also important in its impact on selectivity, and to a lesser degree, on the DAO yield. The major effect of the solvent-to-oil ratio is that a higher ratio results in a higher quality of the DAO for a fixed deasphalted yield. A high solvent-to-oil ratio is preferred because of better selectivity, but increased operating costs conventionally dictate that ratios be limited to a relatively narrow range. Selection of the solvent is also a factor in establishing operational solvent-to-oil ratios. The necessary solvent-to-oil ratio decreases as the critical solvent temperature increases. The solvent-to-oil ratio is, therefore, a function of desired selectivity, operation costs and solvent selection. For example, in a system such as that of FIG. 1, the total solvent:oil ratio (V:V) can be in the range of about 2:1-50:1, 3:1-50:1, 4:1-50:1, 2:1-20:1, 3:1-20:1, 4:1-20:1, 2:1-10:1, 3:1-10:1, 4:1-10:1, 2:1-8:1, 3:1-8:1 or 4:1-8:1.

Characteristics of the feed that can influence the quantity and quality of DAO produced include (but are not limited to) the API (American Petroleum Institute) gravity, the UOP Characterization Factor (known as the "UOPK" factor established by UOP, UOP Method 375-07, Calculation of UOP Characterization Factor and Estimation of Molecular Weight of Petroleum Oil, available at https://www.astm.org/Standards/UOP375.htm), the asphaltenes content, the Conradson carbon content, the metals content, the nitrogen content, and the sulfur content. In general, heavier feed results in lower quality of DAO for a given DAO yield. The feed composition is expected to be within a specified design range, and any small changes in feed composition can be compensated for by variation in the extraction temperature. Major changes in feed, such as use of crude of a different type or from a different source, typically require variations in operating conditions and/or different solvent selection.

The pitch product contains a majority of the contaminants from the charge, that is, metals, asphaltenes, Conradson carbon, and is also rich in aromatic compounds and asphaltenes. A three-product unit, in which resin, DAO and pitch can be recovered, is also available. This design allows for a range of bitumens to be manufactured from various resin/pitch blends.

Further material regarding solvent deasphalting can be found in U.S. Pat. Nos. 4,816,140; 4,810,367; 4,747,936; 4,572,781; 4,502,944; 4,239,616; 4,305,814; 4,290,880; 4,482,453 and 4,663,028, all of which are incorporated herein by reference in their entireties.

With reference to FIG. 1, in the operation of a typical SDA process, the feed 4 and solvent stream 14 are mixed, for example using an in-line mixer or a separate mixing vessel (not shown). Mixing can occur within the primary phase separation zone 20, or prior to entering the primary phase separation zone 20. Solvent stream 14 includes all or a portion of recycle streams 44, 54 and make-up solvent stream 16. The mixture of hydrocarbon and solvent is passed to primary phase separation zone 20 in which phase separation occurs. Primary phase separation zone 20 serves as the first stage for the extraction of DAO from the feedstock.

The two phases formed in the primary phase separation zone 20 are an asphalt phase and a primary DAO phase, which are recovered via outlets 22, 24 respectively. The temperature at which the contents of the primary phase separation zone 20 are maintained is sufficiently low in order to maximize recovery of the DAO from the feedstock. In general, components with a higher degree of solubility in the non-polar solvent will pass with the primary DAO phase 24. The primary DAO phase 24 includes a major portion of the solvent, a minor portion of the asphalt content of the feedstock and a major portion of the DAO content of the feedstock.

In a typical SDA unit, the primary DAO phase 24 from primary phase separation zone 20 is passed to secondary phase separation zone 30 which serves as the final stage for the extraction. An asphalt phase separates and forms at the bottom of secondary phase separation zone 30 due to increased temperature, that is, approaching the critical temperature of the solvent. The asphalt phase is recovered via an outlet 32, and can contain a small amount of solvent and DAO. A portion 32a of the asphalt phase 32 is optionally recycled back to primary phase separation zone 20 for the recovery of the remaining DAO, or optionally mixed with asphalt stream 22. The secondary DAO phase is discharged as stream 34 from secondary phase separation zone 30 and is typically passed to the DAO separation zone 40 to recover and recycle solvent.

The DAO separation zone 40 contains one or more suitable vessels arranged and dimensioned to permit a rapid and efficient flash separation of solvent from DAO stream 24. The solvent is flashed from DAO separation zone 40 and discharged as a stream 44, for recycle to the primary phase separation zone 20. In typical SDA operations, solvent is substantially recycled. For instance, in conventional operations it is desirable to maximize solvent recycle, for instance, so that at least about 90-99 V % of the total solvent contained in stream 34 is recycled to the primary phase separation zone 20 as stream 44, with only minor or trace amounts passing with the DAO stream 24. For example, in certain embodiments, typical DAO streams contain up to about 10, 7.5, 5 or 1 V % solvent.

A bottoms DAO stream 42 from separation zone 40 is optionally passed to a steam stripper 60 for steam stripping of the solvent as conventionally known, for instance using dry steam at a pressure in the range of about 1-30, 1-10, 5-30 or 5-10 bars. A DAO product stream 62 is collected from the bottom of the stripping vessel 60, and a steam and solvent mixture is conveyed via stream 64, for instance, to a low pressure solvent recovery tower (not shown).

The asphalt stream 22 from primary phase separation zone 20 is charged to asphalt separation zone 50. Additional solvent is flashed from separation zone 50 and discharged as a stream 54, for recycle to the primary phase separation zone 20. A bottoms asphalt stream 52 from separation zone 50 is optionally passed to a steam stripper 70 for steam stripping of the solvent as conventionally known, for instance using dry steam at a pressure in the range of about 1-30, 1-10, 5-30 or 5-10 bars. A bottoms asphalt stream 72 is recovered from stripping vessel 70, and a steam and solvent mixture is conveyed via stream 74 to a low pressure solvent recovery tower (not shown).

One embodiment of an enhanced solvent deasphalting and demetallizing process and system of the present disclosure is shown and described with reference to FIG. 2. Components that are arranged in a similar configuration and operate in a similar manner to those described with reference to FIG. 1 use like reference numerals in FIG. 2. An enhanced solvent deasphalting and demetallizing system 102 generally includes a primary phase separation zone 120, a secondary phase separation zone 130, a DDMO separation zone 140, an optional asphalt separation zone 150, and an adsorptive demetallizing zone 180 between the secondary phase separation zone 130 and the DDMO separation zone 140. In certain optional embodiments, a DDMO steam stripper 160 and/or an asphalt steam stripper 170 are included for steam stripping of solvent.

The primary phase separation zone 120 generally includes one or more inlets for receiving heavy feedstock 104 and one or more inlets receiving a solvent stream 114, which may be a common inlet as shown or separate inlets. The primary phase separation zone 120 also includes one or more outlets for discharging an asphalt phase 122 and one or more outlets for discharging a reduced asphalt content phase stream 124, which is the primary DAO phase that is passed to the secondary phase separation zone 130. In certain embodiments, the primary phase separation zone 120 is in direct fluid communication with the adsorptive demetallizing zone 180, for instance, via stream 124*a*.

The source of the solvent stream 114 comprises internal recycle solvent streams 144, 154 (when provided) and external solvent sources. The external solvent source can be a make-up solvent stream 116 as is conventionally known. In certain embodiments, instead of or in addition to a conventional make-up solvent stream 116, a portion 108*a* of a fraction 108 is used as solvent, wherein the fraction 108 is derived from an initial feed 104*a*, as described further herein in conjunction with certain embodiments including an integrated upstream separation step. An optional solvent drum 112 (shown in dashed lines) can be integrated to receive the one or more of the solvent steams, such as recycle solvent streams 144, 154, make-up solvent 116 and/or a portion 108*c* of the fraction 108 derived from the initial feed 104*a*. In other embodiments, a solvent drum is not used, and the one or more solvent sources are combined to form stream 114, and/or directly charged to the primary phase separation zone 120 (and in certain embodiments in the secondary phase separation zone 130).

Secondary phase separation zone 130 includes one or more inlets in fluid communication with the primary DAO phase 124 outlet from primary phase separation zone 120, and one or more outlets for discharging an asphalt phase 132 (optionally in fluid communication with the primary phase separation zone 120, stream 132*a* shown in dashed lines). The secondary phase separation zone 130 also includes one or more outlets for discharging a secondary DAO phase 134 that is in fluid communication with a DAO inlet of adsorptive demetallizing zone 180. In certain embodiments the outlet(s) for discharging a secondary DAO phase 134 is in direct fluid communication with an inlet of the adsorptive demetallizing zone 180, that is, without any flash, distillation and/or additional phase separation steps therebetween.

The adsorptive demetallizing zone 180 includes one or more inlets for receiving a stream 135, which is all or a portion of the stream 134, in certain embodiments combined with all or a portion of the reduced asphalt content phase stream 124, shown as the stream 124*a*. The adsorptive demetallizing zone 180 also includes one or more outlets for discharging the DDMO 184 phase having a reduced metal content, which is in fluid communication with a DDMO inlet of the DDMO separation zone 140. A stream 186 can optionally be included to provide fluid communication between the adsorptive demetallizing zone 180 and the solvent drum 112, for instance, to receive desorbing solvent as described in certain embodiments herein.

The separation zone 140 includes one or more outlets for recovering the recycle solvent stream 144, which is in fluid communication with the primary phase separation zone 120 (optionally via solvent drum 112). The separation zone 140 also includes one or more outlets for discharging DDMO product 142. The asphalt stream outlets 122, 132 can be in fluid communication with the inlet of an optional asphalt separation zone 150 for solvent recovery. The separation zone 150 includes one or more outlets for recovering the recycle solvent stream 154, which is in fluid communication with the primary phase separation zone 120 inlet (optionally via solvent drum 112). The separation zone 150 also includes one or more outlets for discharging asphalt 152. In certain optional embodiments, all or a portion of the streams 122 and/or 132 can be discharged to an asphalt pool 190 with entrained solvent, for instance which that can remain or be removed at a later stage (not shown). In further embodiments, the separation zone 150 is not used, as indicated by dashed lines, and the streams 122 and 132 are discharged to the asphalt pool 190 with entrained solvent.

In certain optional embodiments, a steam stripper 160 is included for steam stripping of the solvent from the DAO, including one or more inlets in fluid communication with the deasphalted oil outlet 142, one or more outlets for discharging solvent 164, and one or more outlets for discharging steam stripped DAO 162. Further, in optional embodiments, a steam stripper 170 is included for steam stripping of the solvent from the asphalt 152, including one or more inlets in fluid communication with the asphalt outlet 152, one or more outlets for discharging solvent 174, and one or more outlets for discharging steam stripped asphalt 172. The asphalt pool 190 can also be integrated for receiving the discharged asphalt stream 152 and/or steam stripped asphalt 172 and/or all or a portion of streams 122 or 132, optionally along with spent adsorbent material and/or desorbed contaminants from adsorptive demetallizing zone 180 via line 182.

In operation of the enhanced solvent deasphalting and demetallizing system 102, a heavy feedstock 104 and solvent stream 114 (optionally via solvent drum 112) are passed to primary phase separation zone 120 in which phase separation occurs. Primary phase separation zone 120 serves as the first stage for the extraction of DAO from the feedstock. The two phases formed in the primary phase separation zone 120 are an asphalt phase recovered via outlet 122 and a primary DAO phase recovered via outlet 124. In general, components with a higher degree of solubility in the non-polar solvent will pass with the primary DAO phase 124.

The asphalt stream 122 from primary phase separation zone 120 can be charged to the asphalt separation zone 150 for flash separation of solvent. Optionally, all or a portion of the asphalt stream 122 can be passed to the asphalt pool 190 with the entrained solvent. The solvent is recovered and recycled via stream 154. The bottoms stream 152 is typically mixed with an asphalt pool 190, optionally via a steam stripper. For instance, asphalt stream 152 from separation zone 150 can be passed to a steam stripper 170 for steam stripping of the solvent as conventionally known, for instance using dry steam at a pressure in the range of about 1-30, 5-30, 1-10 or 5-10 bars. A bottoms asphalt stream 172 is recovered from stripping vessel 170 and passed to the asphalt pool 190, and a steam and solvent mixture is conveyed via stream 174 to a low pressure solvent recovery tower (not shown).

The primary DAO phase 124 generally includes a minor portion of the asphalt content of the feedstock and at least a major portion of the DAO content of the feedstock. The primary DAO phase 124 also includes, for instance, on a volume percent basis, a major portion, a significant portion or a substantial portion of the total solvent content of stream 114, with the remainder passing to the asphalt phase 122. In addition, the primary DAO phase 124 typically contains up to about 1,000, 500 or 100 ppmw asphaltenes, and the remainder of the asphaltic content from the feedstock passes to the asphalt phase 122. Further, the primary DAO phase 124 contains a major portion, a significant portion or a substantial portion of the DAO content of the feedstock, with the remainder passing to the asphalt phase 122.

The primary DAO phase 124 is passed to the secondary phase separation zone 130, which serves as the final stage for the extraction. The secondary phase separation zone 130 can be carried out in one or more settler vessels. In certain embodiments, the arrangement of the primary phase separation zone 120 and secondary phase separation zone 130 can be similar to that used in conventional solvent deasphalting as described with respect to FIG. 1, modified as described herein concerning handling and treatment of a secondary DAO phase 134. In certain embodiments, additional solvent is added to the secondary phase separation zone 130, for instance, shown in dashed lines as streams 108d and 114a.

In the vessel(s), an asphalt phase 132 separates and forms at the bottom of secondary phase separation zone 130 due to increased temperature, that is, approaching the critical temperature of the solvent. The asphalt phase can contain a small amount of solvent and DAO, for instance no more than a minor portion. All or any portion of the asphalt phase 132 can be recycled back to primary phase separation zone 120 for the recovery of remaining DAO, shown as stream 132a. In other embodiments asphalt phase 132 can optionally be mixed with asphalt stream 122. Stream 132a can represent about 0-100, 0-99.5, 0-70, 0-50, 0-25, 10-100, 10-99.5, 10-70, 10-50, 10-25, 30-100, 30-99.5, 30-70 or 30-50 V % of stream 132. Optionally, all or a portion of the asphalt stream 132 can be passed to the asphalt pool 190 with the entrained solvent.

A mixture containing the secondary DAO phase and the solvent is discharged as stream 134 from secondary phase separation zone 130. The secondary DAO phase 134 includes at least, for instance, on a weight percent basis, a major portion, a significant portion or a substantial portion of the total solvent content of stream 124, with the remainder passing to the secondary asphalt phase 132. In addition, the secondary DAO phase 134 typically contains up to about 1,000, 500 or 100 ppmw asphaltenes, and the remainder of the asphaltic content from the feedstock passes to the secondary asphalt phase 132. Further, the secondary DAO phase 134 contains at least, for instance, on a weight percent basis, a major portion, a significant portion or a substantial portion of the feedstock, with the remainder passing to the secondary asphalt phase 132.

Stream 134, the mixture containing the secondary DAO phase and the solvent, is discharged from secondary phase separation zone 130. All or a portion of stream 134 is passed to the adsorptive demetallizing zone 180 for demetallization. In certain embodiments, no solvent is recovered and recycled from stream 134, and the entire mixture from the secondary phase separation zone 130 (e.g., a settler vessel within said zone) is passed directly to the adsorptive demetallizing zone, with no intermediate separation. In other embodiments (not shown), less than 1, 2 or 4 V % of solvent is recovered. In other embodiments, no more than a minor portion of solvent is recovered, and in certain embodiments no more than 20 V % is recovered.

In certain embodiments, a portion 134a of stream 134 is diverted, where such portion is not a phase separated portion but rather a full range of the mixture having a composition similar to the remainder of stream 134 that is passed to the adsorptive demetallizing zone 180. Note that while portion 134a is shown downstream of an optional mixing zone 136 and upstream of the adsorptive demetallizing zone 180, it can also be upstream the optional mixing zone 136 and downstream of the secondary phase separation zone 130. This portion can be sent to the DDMO separation zone 140. In certain embodiments, this portion 134a can be less than 1, 2 or 4 V % of total stream 134. In other embodiments, no more than a minor portion of stream 134 is routed as stream 134a, and in certain embodiments no more than 20 V % of stream 134 is routed as stream 134a.

In certain embodiments, a portion 124a of the stream 124 from the primary phase separation zone 120 may be diverted to the adsorptive demetallizing zone 180 without further separation in the secondary phase separation zone 130. Note that while portion 134a is shown upstream of an optional mixing zone 136, it can also be downstream of the optional mixing zone 136. In certain embodiments, this portion 124a can be less than 1, 2 or 4 V % of total stream 124. In other embodiments, no more than a minor portion of stream 124 is routed as stream 124a. In other embodiments, a major portion of stream 124 is routed as stream 124a, for instance, up to about 70 V %.

In certain embodiments, one or more mixing zones 136 are integrated between the outlet of secondary separation zone 130 and the inlet of adsorptive demetallizing zone 180 for mixing, such as one or more in-line mixer devices or a separate mixing vessel (not shown). Mixing zone 136 can be in-line mixer, a separate mixing vessel, and/or appropriate configuration and length of conduit between the outlet of secondary separation zone 130 and the inlet of adsorptive demetallizing zone 180. In this manner, the intimate mixture of DAO and solvent is provided to the adsorptive demetallizing zone 180 for more effective contact with the adsorbent material. This mixing zone 136 can receive stream 134, the mixture containing the secondary DAO phase and the solvent. In certain embodiments, stream 124a is also received by the mixing zone 136. The mixture is discharged to the adsorptive demetallizing zone 180 as stream 135.

The adsorbent unit effluent, which now contains less undesirable metal compounds, is passed via line 184 to the DDMO separation zone 140. Solvent is flashed from the mixture and discharged as a stream 144, typically for recovery and recycle, for instance through the optional solvent drum 112 or directly to the primary phase separation zone 120. The DDMO stream 142 from separation zone 140 is optionally passed to a steam stripper 160 for steam stripping of the solvent as is conventionally known, for instance using dry steam at a pressure in the range of about 1-30, 5-30, 1-10 or 5-10 bars. A DDMO product stream 162 is collected from the bottom of the stripping vessel 160, and a steam and solvent mixture is conveyed via stream 164, for instance, to a low pressure solvent recovery tower (not shown).

Another embodiment of an enhanced solvent deasphalting process is shown and described with reference to FIG. 3. Components that are arranged in a similar configuration and operate in a similar manner to those described with reference to FIGS. 1 and 2 use like reference numerals in FIG. 3. An enhanced solvent deasphalting system 202 generally includes a phase separation zone 220, a DDMO separation zone 240, an asphalt separation zone 250 and an adsorptive demetallizing zone 280 between the phase separation zone 220 and the DDMO separation zone 240. In certain optional embodiments, a DDMO steam stripper 160 and/or an asphalt steam stripper 170 are included for steam stripping of solvent.

Phase separation zone 220 generally includes an inlet for receiving hydrocarbon stream 204 and a solvent stream 214. The source of solvent stream 214 comprises recycle solvent streams 244, 254, and one or both of a make-up solvent stream 216 and a portion 208a of a fraction 208 derived from an initial feed 204a, described further herein in conjunction with certain embodiments including an integrated upstream separation step. Phase separation zone 220 also includes an outlet for discharging an asphalt phase 222 and an outlet for discharging a reduced asphalt content phase 224, which is the DAO phase that is passed to the adsorptive demetallizing zone 280.

In certain embodiments, a solvent drum 212 is integrated to receive the one or more of the solvent steams, such as recycle solvent 244, 254, make-up solvent 216 and/or a portion 208c of the fraction 208 derived from the initial feed 204a. In certain embodiments, a solvent drum is not used and the one or more solvent sources are integrated with the stream 214 or directly charged to the phase separation zone 220.

Adsorptive demetallizing zone 280 includes an inlet for receiving all or a portion of stream 224, and an outlet for discharging the DAO 284 phase having a reduced metal content, which is in fluid communication with a DAO inlet of the DDMO separation zone 240. In certain embodiments, a stream 286 is included to provide fluid communication between adsorptive demetallizing zone 280 and solvent drum 212, for instance, to receive desorbing solvent as described further herein.

The separation zone 240 includes an outlet for discharging a solvent stream 244, which is in fluid communication with the phase separation zone 220 (optionally via solvent drum 212). The separation zone 240 also includes an outlet for discharging DDMO product 242.

The asphalt stream 222 outlet is in fluid communication with the inlet of asphalt separation zone 250 for solvent recovery. The separation zone 250 also includes an outlet for discharging a recycle solvent stream 254, which is in fluid communication with the phase separation zone 220 (optionally via solvent drum 212). The separation zone 250 also includes an outlet for discharging asphalt 252.

In certain optional embodiments, a steam stripper 260 is included for steam stripping of the solvent from the DAO, including one or more inlets in fluid communication with the deasphalted oil outlet 242, one or more outlets for discharging solvent 264, and one or more outlets for discharging steam stripped DAO 262. Further, in optional embodiments, a steam stripper 270 is included for steam stripping of the solvent from the asphalt 252, including one or more inlets in fluid communication with the asphalt outlet 252, one or more outlets for discharging solvent 274, and one or more outlets for discharging steam stripped asphalt 272. An asphalt pool 290 can also be integrated for receiving the discharged asphalt stream 252, and/or steam stripped asphalt 272, along with spent adsorbent material and/or desorbed contaminants from adsorptive demetallizing zone 280 via line 282.

In operation of the enhanced solvent deasphalting and demetallizing system 202, a hydrocarbon feedstock stream 204 and solvent stream 214 (optionally via solvent drum 212) are passed to phase separation zone 220 in which phase separation occurs.

The two phases formed in the phase separation zone 220 are an asphalt phase and a DAO phase, which are recovered via outlets 222, 224 respectively. The temperature at which the contents of the phase separation zone 220 are maintained is sufficiently low in order to maximize recovery of the DAO from the feedstock. In general, components with a higher degree of solubility in the non-polar solvent will pass with the DAO phase 224.

The asphalt stream 222 from phase separation zone 220 is charged to asphalt separation zone 250 for flash separation of solvent. The solvent is recovered or recycled via stream 254. The bottoms stream 252 is typically mixed with an asphalt pool 290, optionally via a steam stripper. For instance, asphalt stream 252 from separation zone 250 can be passed to a steam stripper 270 for steam stripping of the solvent as conventionally known, for instance using dry steam at a pressure in the range of about 1-30, 5-30, 1-10 or 5-10 bars. A bottoms asphalt stream 272 is recovered from stripping vessel 270 and passed to the asphalt pool 290, and a steam and solvent mixture is conveyed via stream 274 to a low pressure solvent recovery tower (not shown).

The DAO phase 224 generally includes a minor portion of the asphalt content of the feedstock and at least a major portion of the DAO content of the feedstock. The DAO phase 224 also includes, for instance, on a weight percent basis, a major portion, a significant portion or a substantial portion of the total influent solvent, with the remainder passing to the asphalt phase 222. In addition, the DAO phase 224 contains up to 0.1, 5 or 10 V % of the asphaltic content of the feedstock, with the remainder passing to the asphalt phase 222. Further, the DAO phase 224 contains, for instance, on a weight percent basis, a major portion, a significant portion or a substantial portion of the DAO content of the feedstock, with the remainder passing to the asphalt phase 222.

Stream 224, the mixture containing the secondary DAO phase and the solvent, is discharged from phase separation zone 220. All or a portion of stream 224 is passed to the adsorptive demetallizing zone 280 for demetallization. In certain embodiments, no solvent is recovered and recycled from stream 224, and the entire mixture from the phase separation zone 220 (e.g., a settler vessel within said zone) is passed directly to the adsorptive demetallizing zone, with no intermediate separation. In other embodiments (not shown), less than 1, 2 or 4 V % of solvent is recovered. In other embodiments, no more than a minor portion of solvent is recovered, and in certain embodiments no more than 20 V % is recovered.

In certain embodiments, a portion 224a of stream 224 is diverted, where such portion is not a phase separated portion but rather a full range of the mixture having a composition similar to the remainder of stream 224 that is passed to the adsorptive demetallizing zone 280. Note that while portion 224a is shown downstream of an optional mixing zone 236 and upstream of the adsorptive demetallizing zone 280, it can also be upstream the optional mixing zone 236 and downstream of the phase separation zone 220. This portion can be sent to the DDMO separation zone 240. In certain embodiments, this portion 224a can be less than 1, 2 or 4 V % of total stream 224. In other embodiments, no more than a minor portion of stream 224 is routed as stream 224a, and in certain embodiments no more than 20 V % of stream 224 is routed as stream 224a.

In certain embodiments, one or more mixing zones 236 are integrated between the outlet of separation zone 220 and the inlet of adsorptive demetallizing zone 280 for mixing, such as one or more in-line mixer devices or a separate mixing vessel (not shown). Mixing zone 236 can be in-line mixer, a separate mixing vessel, and/or appropriate configuration and length of conduit between the outlet of separation zone 220 and the inlet of adsorptive demetallizing zone 280. In this manner, the intimate mixture of DAO and solvent is provided to the adsorptive demetallizing zone 280 for more effective contact with the adsorbent material. This mixing zone 236 can receive stream 224, the mixture containing the secondary DAO phase and the solvent. The mixture is discharged to the adsorptive demetallizing zone 280 as stream 225.

The adsorbent unit effluent, which now contains less undesirable metal compounds, is passed via line 284 to the DDMO separation zone 240. Solvent is flashed from the mixture and discharged as a stream 244, typically for recovery and recycle, for instance through the optional solvent drum 212 or directly to the phase separation zone 220. The DDMO stream 242 from separation zone 240 is optionally passed to a steam stripper 260 for steam stripping of the solvent as conventionally known, for instance using dry steam at a pressure in the range of about 1-30, 5-30, 1-10 or 5-10 bars. A DDMO product stream 262 is collected from the bottom of the stripping vessel 260, and a steam and solvent mixture is conveyed via stream 264, for instance, to a low pressure solvent recovery tower (not shown).

Figure 2:
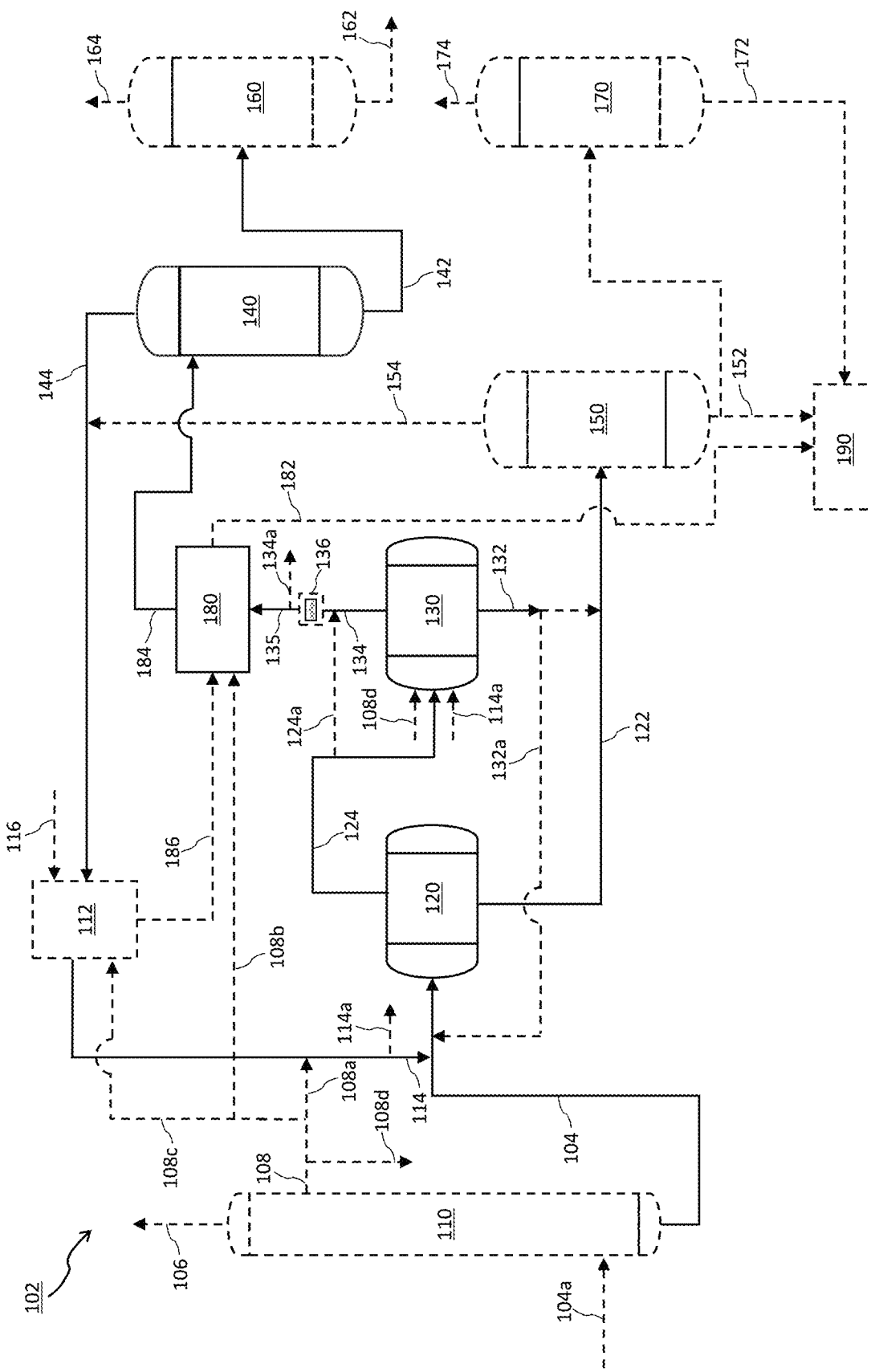
FIG. 2 is a process flow diagram of an embodiment of an enhanced SDA/DM process and system.
Figure 3:
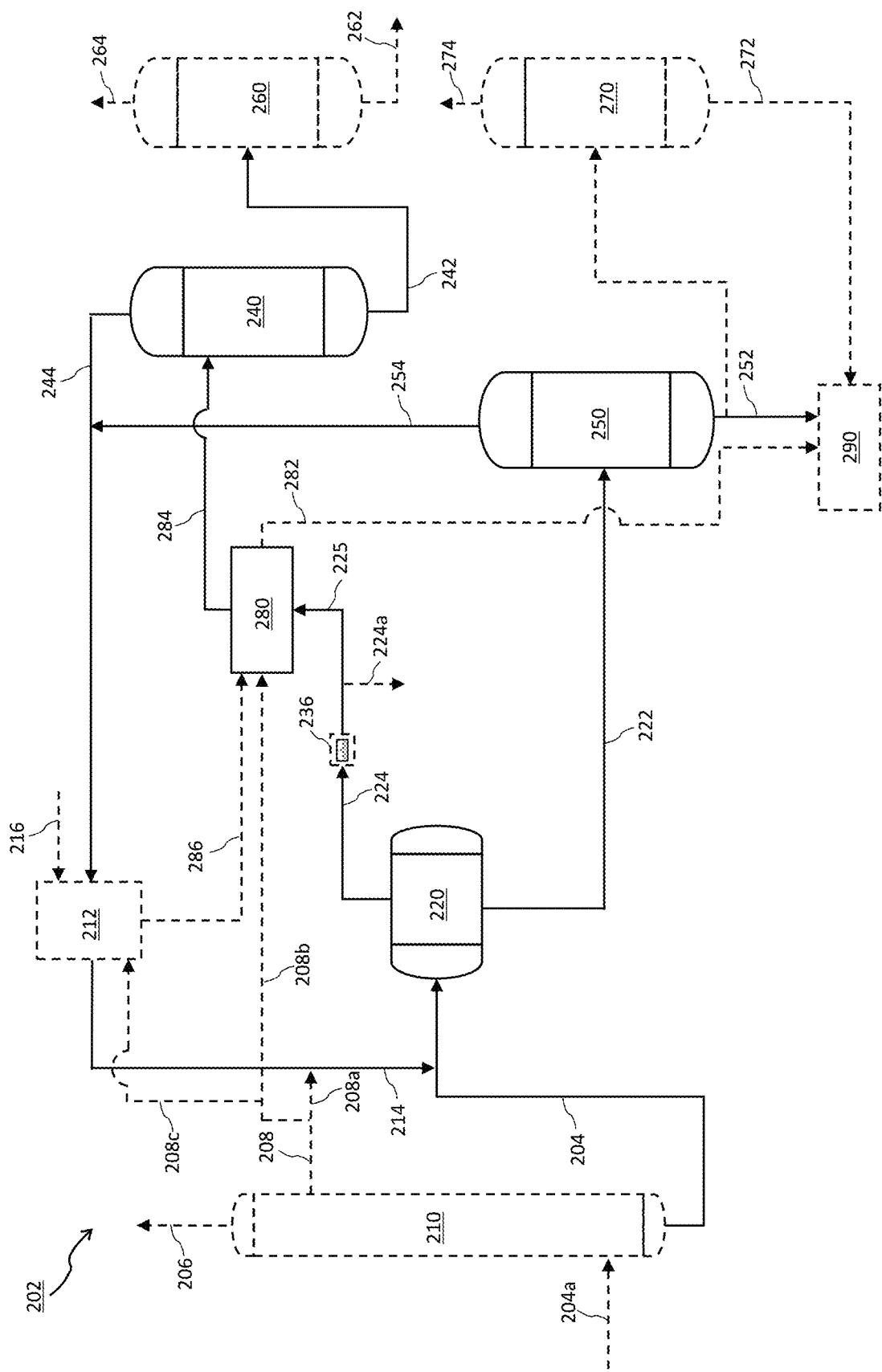
FIG. 3 is a process flow diagram of another embodiment of an enhanced SDA/DM process and system.

In certain embodiments, as shown in dashed lines in FIGS. 2 and 3, a separation zone 110 or 210 is included upstream of the phase separation zone 120 or 220. An initial feedstock 104a or 204a is fractioned into a light fraction 106 or 206, and a heavy feedstock 104 or 204, which serves as the feed to the phase separation zone 120 or 220. In certain embodiments, the upstream separation zone is operated as a flash vessel with cut point in the range effective to recover fractions at and below the naphtha and diesel range as light fraction 106 or 206, and a heavy fraction 104 or 204 as the feed to the phase separation zone 120 or 220. In additional embodiments, the upstream separation zone is operated as a distillation column, with a fraction 108 or 208 recovered for use as all or a portion of solvent 108a or 208a for the phase separation zone and/or solvent 108b or 208b for the adsorbent material desorption. For example, effective fractions that can be recovered for use as all or a portion of solvent include those in the naphtha range. In certain embodiments effective fractions include light naphtha, for instance, boiling in the range of about 110, 100, 90, 88 or 80° C. and below. In certain embodiments, separate fractions can be used as solvent for the phase separation zone and/or adsorbent material desorption, as described herein.

In embodiments in which an upstream fractionating zone is used and a solvent drum is used, a portion 108c or 208c of fraction 108 or 208 can be passed to the phase separation zone 120 or 220 via the solvent drum 112 or 212. In embodiments in which an upstream fractionating zone is used (with or without the solvent drum), a portion 108a or 208a of fraction 108 or 208 can be passed to the phase separation zone 120 or 220 (directly or combined with solvent stream 114 or 214).

Various devices can be used as, or in conjunction with, the phase separation zones described herein. In the embodiment of FIGS. 2 and 3, the phase separation zones can include apparatus effective to cause the desired mixing and liquid-liquid contact between the solvent feed, and resulting phase separation.

In certain embodiments, the contents are mixed using an in-line mixer or a separate mixing vessel (not shown), as part of the phase separation zone or prior to entering the phase separation zone. The mixture is then allowed to settle and phase separate, for instance in a decanting vessel. For example, a battery of mixers-decanters can be used as the primary phase separation zone. The contents of the primary phase separation zone remain in contact under conditions suitable for phase separation, as determined, for example, by testing of samples recovered via a collection probe using appropriate analytical apparatus (not shown).

The heavy feedstock can be residues, short residues, long residues or other heavy fractions derived from naturally occurring hydrocarbons including crude oil, bitumens, heavy oils, or shale oils, or hydrocarbon mixtures derived from refinery process units including hydrotreating, hydroprocessing, fluid catalytic cracking, coking, and visbreaking or coal liquefaction, or derived from bio-material conversion such as cellulose, wood pyrolysis. In certain embodiments, the feedstream 104 or 204 is obtained from a crude distillation tower, such as an atmospheric or vacuum distillation tower, as atmospheric or vacuum residue. In additional embodiments, the feed can be whole crude oil, topped crude oil, and crude oil or topped crude oil that has undergone some pre-treatment, such as water-oil separation, gas-oil separation, desalting and/or stabilization. In certain embodiments, the feedstock is crude oil having a mixture of hydrocarbon compounds with boiling points in the range of about 36° C. to about the endpoint, for example about 1,500° C. In further embodiments a suitable feed includes atmospheric and/or vacuum residual fractions having an endpoint value corresponding to the heaviest component of the feed, for example at or above about 1,500° C., and a lower range boiling point value starting at 370-520° C., 370-450° C. or 450-520° C. Such fractions include one or more streams in the vacuum residue range, for instance, boiling above about 520° C., or in the atmospheric residue range, for instance, boiling above about 370° C. In additional embodiments feeds 104, 204 can also include lighter components such as vacuum gas oil typically boiling in the range of about 370-520° C., or atmospheric gas oil typically boiling in the range of about 240-370° C.

In embodiments in which a separation zone 106 or 206 is integrated upstream of the primary phase separation zone, the initial feed 104a or 204a can be, for instance, whole crude oil or topped crude oil.

The feed 104, 204 can contain impurities including one or more of metals such as nickel, vanadium, iron, and molybdenum, and other heteroatom compounds including organosulfur and organonitrogen compounds, which is typical for crude oil or heavy fractions. In particular, the process and system herein is effective for treating feeds having metalloporphyrins or other metals chelated with ligands, such as nickel and/or vanadium compounds, in addition to metals commonly found in asphaltenes or resins, at a level of 2 ppmw, 4 ppmw, 8 ppmw, 20 ppmw or greater, and which is derived from atmospheric and/or vacuum distillation.

The solvent stream used in the phase separation zones comprises paraffin hydrocarbons generally in the naphtha or light naphtha range. The solvent stream can be a separate solvent stream, or in certain embodiments can be all or part of a light stream derived from an integrated separation zone 106 or 206. For instance, in certain embodiments, separation zone 106 or 206 comprises a fractionator operable to separate a light naphtha fraction containing a suitable concentration of paraffin hydrocarbons containing from 3 through 9, 3 through 8 or 3 through 7 carbon atoms.

The ratio (by volume) of feed to solvent in the mixture can be generally in the range of from about 2:1-50:1, 3:1-50:1, 4:1-50:1, 2:1-20:1, 3:1-20:1, 4:1-20:1, 2:1-10:1, 3:1-10:1, 4:1-10:1, 2:1-8:1, 3:1-8:1 or 4:1-8:1. The pressure and temperature conditions at which the mixture remains in a settler of phase separation zones 120, 130, 220 are generally at or below the critical properties of the solvent to maintain the solvent and oil components in the liquid phase. For instance, for a system using n-butane, a suitable temperature range is about 60-150, 70-150, 60-90 or 70-90° C., and a suitable pressure range is about 1-25, 1-23, 18-25 or 18-23 bars. In a process using n-pentane, a suitable temperature range is about 60-180, 60-145, 120-180 or 120-145° C., and a suitable pressure range is about 1-27, 1-25, 10-27 or 10-25 bars.

The operating conditions including temperature and pressure that are below the solvent's critical pressure and temperature are effective to disturb the equilibrium of the asphaltenes in maltenes solution, and to flocculate the solid asphaltenes particles. The properties including critical temperatures and pressures for certain paraffinic solvents are given in Table 1.

In embodiments in which make-up solvent 116 or 216 is provided, it can be less than up to about 0.1, 1, 5, 20 or 30 V % of the total solvent 114 or 214. In other embodiments, no more than a minor portion of solvent 114 or 214 comprises make-up solvent 116 or 216. In certain embodiments, no external make-up solvent 116 or 216 are used. In such embodiments with make-up solvent 116 or 216 provided, recycle stream 144 or 244 can comprise about 99.9, 99, 95, 80 or 70 V % of stream 114 or 214, and make-up solvent stream 154 or 254 can comprise the remainder. The make-up solvent can be any conventional non-polar solvent, or solvents, if more than one is employed, preferably have an overall Hildebrand solubility parameter of less than about 8.0 or the complexing solubility parameter of less than 0.5 and a field force parameter of less than 7.5. Suitable non-polar solvents include, for example, saturated aliphatic hydrocarbons such as pentanes, hexanes, heptanes, paraffin streams including C5-C11, C5-C9, C5-C8 or C5-C7. Paraffinic naphthas in these ranges are effective.

In certain embodiments, the only source of solvent is obtained from fraction 108 or 208 derived from the initial feed 104a or 204a (which includes one or both of recycle solvent 144 or 244 and 154 or 254); that is, external make-up solvent 116 or 216 is not provided. The solvent can be integrated directly as shown via stream 108a or 208a and/or via the solvent drum 112 or 212 via stream 108c or 208c. In embodiments where solvent is added only to the phase separation zone 120 or 220 and/or the solvent drum 112 or 212 (that is, neither solvent 108d or 114a is not added to the secondary phase separation zone 130 in the embodiment of FIG. 2), portions 108a or 208a and/or 108c or 208c can comprise up to about 70, 80, 95, 99, 99.9 or 100 V % of stream 108 or 208; stream 108 or 208 is, for example, a C5-C7 paraffinic naphtha fraction and/or a C5-C11 paraffinic/naphthenic naphtha fraction. Suitable conditions in the phase separation zones are below the critical conditions for the solvent. For example, where stream 108 or 208 is a C5-C7 naphtha fraction, suitable conditions in the phase separation zones include a temperature in the range of about 80-180, 90-180, 100-180, 80-170, 90-170, 100-170, 80-160, 90-160 or 100-160, and a pressure in the range of about 1-3 bars.

In certain embodiments, additional solvent is added to secondary phase separation zone 130, for instance, shown as stream 108d which is a portion of stream 108 derived from an initial feed 104a, and/or as stream 114a which is a portion of solvent stream 114.

In embodiments in which the portion 114a of solvent stream 114 is added to secondary phase separation zone 130 and is the only source of solvent added to zone 130 (that is, portion 108d is not used), such portion 114a can comprise up to about 10, 20, 30 or 50 V % of stream 114.

In embodiments in which the portion 108d of stream 108 is added to secondary phase separation zone 130 and is the

TABLE 1

| Name | Formula | MW g/g-mol | Boiling Point ° C. | Specific Gravity | Critical Temperature ° C. | Critical Pressure bar |
|---|---|---|---|---|---|---|
| propane | C3 H8 | 44.1 | −42.1 | 0.508 | 96.8 | 42.5 |
| n-butane | C4 H10 | 58.1 | −0.5 | 0.585 | 152.1 | 37.9 |
| i-butane | C4 H10 | 58.1 | −11.7 | 0.563 | 135.0 | 36.5 |
| n-pentane | C5 H12 | 72.2 | 36.1 | 0.631 | 196.7 | 33.8 |
| i-pentane | C5 H12 | 72.2 | 27.9 | 0.625 | 187.3 | 33.8 |
| n-hexane | C6 H14 | 86.2 | 68.0 | 0.655 | 235.0 | 30.0 |
| n-heptane | C7 H16 | 100.2 | 98.4 | 0.684 | 267.0 | 27.5 | only source of solvent added to zone 130 (that is, portion 114*a* is not used), such portion 108*d* can comprise up to about 70, 80, 95, 99 or 99.1 V % of stream 108.

In embodiments in which both the portion 108*d* of stream 108 and the portion 114*a* of stream 114 is added to secondary phase separation zone 130, the portions 108*d* and 114*a* are provided accordingly. For instance, portion 108*d* can comprise about 5, 10, 20, 30 or 50 V % of stream 108, and portion 114*a* can comprise up to about 5, 10, 20, 30 or 50 V % of stream 114.

In embodiments where the only source of solvent is obtained from fraction 108, and no make-up solvent is used, and in which solvent is also added to the secondary phase separation zone 130 via stream 108*d* and/or 114*a*, portions 108*a* and/or 108*c* can comprise up to about 50, 70, 80, 95, 99 or 99.1 V % of stream 108, and, in embodiments in which portion 114*a* is not used, portion 108*d* can comprise up to about 0.1, 1, 5, 20, 30 or 50 V % of stream 108. In embodiments in which portion 108*d* is not used portion 114*a* can comprise up to about 5, 10, 20, 30 or 50 V % of stream 114, and in embodiments in which both portions 108*d* and 114*a* are used portion 114*a* can comprise about 5, 10, 20, 30 or 50 V % of stream 114 and portion 108*d* can comprise about 5, 10, 20, 30 or 50 V % of stream 108.

In the enhanced systems 102, 202 herein, the DAO stream 124, 224, containing a mixture of DAO and solvent, is contacted with an effective quantity of solid adsorbent material in adsorptive demetallizing zone 180, 280 under conditions and for a time sufficient for adsorption of the undesired metal components from the DAO stream 124, 224. The adsorptive demetallizing zone 180 can include one or more suitable apparatus to provide fixed bed or fluidized adsorption. Suitable apparatus for fixed bed processes include but are not limited to packed columns. Suitable apparatus for fluidized adsorption include but are not limited to stirred tank, slurry column, ebullated bed, moving bed, baffled slurry bed, or rotating tubular vessel.

The solid adsorbent material can be selected from the group consisting of clay (e.g., attapulgus clay), silica, silica gel, alumina, silica-alumina, titania-silica, activated carbon, molecular sieves, fresh zeolitic catalyst materials, used zeolitic catalyst materials, and combinations comprising one or more of the foregoing. The material is provided in particulate form of suitable dimension, such as granules, extrudates, tablets, spheres, or pellets of a size in the range of 4-60 mesh.

The quantity of the solid adsorbent material used in the embodiments herein is about 0.1:1 to 20:1 W/W, and preferably about 1:1 to 10:1 W/W (feed-to-adsorbent).

In certain embodiments, adsorbent material is used until its adsorptive capacity is reached, and this spent adsorbent material is mixed in an asphalt pool 190, 290 along with asphalt streams 152, 252. In certain embodiments, the spent adsorbent material is discharged and integrated with the asphalt pool sooner than that point, so that the partially spent adsorbent material more effectively binds with the asphaltenes and other components in the asphalt pool. For instance, when the material has reached about 50 W % capacity (that is, when a particle is capable of adsorbing a mass of contaminants that is equal to what is already present on the particle), it can be blended with the asphalt pool and be effectively integrated.

In additional embodiments, adsorbent material is regenerated or partially regenerated by solvent treatment. In these embodiments, the solvent system can be independent of that used in zones 120, 220, or tightly integrated.

For example, in a solvent system that is independent of that used in zones 120, 220, an aromatic and/or polar solvent can be used, such as benzene, toluene, xylenes or tetrahydrofuran. In embodiments in which an aromatic and/or polar solvent can be used, they can be selected based on their Hildebrand solubility factors or on the basis of two-dimensional solubility factors. The overall Hildebrand solubility parameter is a well-known measure of polarity and has been tabulated for numerous compounds. (See, for example, Journal of Paint Technology, Vol. 39, No. 505, February 1967). The solvents can also be described by two-dimensional solubility parameters, that is, the complexing solubility parameter and the field force solubility parameter. (See, for example, I. A. Wiehe, Ind. & Eng. Res., 34 (1995), 661). The complexing solubility parameter component which describes the hydrogen bonding and electron donor-acceptor interactions measures the interaction energy that requires a specific orientation between an atom of one molecule and a second atom of a different molecule. The field force solubility parameter which describes van der Waal's and dipole interactions measures the interaction energy of the liquid that is not affected by changes in the orientation of the molecules. The polar solvent, or solvents, if more than one is employed, preferably has an overall solubility parameter greater than about 8.5 or a complexing solubility parameter of greater than one and a field force parameter value greater than 8. Examples of polar solvents meeting the desired solubility parameter are toluene (8.91), benzene (9.15), xylene (8.85), and tetrahydrofuran (9.52).

Suitable non-polar solvent, or solvents, if more than one is employed, can have an overall Hildebrand solubility parameter of less than about 8.0 or the complexing solubility parameter of less than 0.5 and a field force parameter of less than 7.5. Suitable non-polar solvents include, e.g., saturated aliphatic hydrocarbons such as pentanes, hexanes, heptanes, paraffinic naphthas, C5-C11, kerosene C12-C15, diesel C16-C20, normal and branched paraffins, mixtures or any of these solvents. Effective solvents include C5-C7 paraffins and C5-C11 paraffinic naphthas.

In a solvent system that is integrated with the solvent system used in zones 120, 220, the solvent can be the same paraffinic solvent used therein, for instance, shown in FIG. 2 as streams 108*b* and/or 186 and in FIG. 3 as streams 208*b* and/or 286. In embodiments where the source of desorption solvent is from fraction 108 or 208 (and not from a solvent drum), portions 108*b* or 208*b* can comprise up to about 10, 20, 30, 50 or 90 V % of stream 108 or 208. In embodiments in which the source of desorption solvent is from solvent drum 112 or 212, and wherein solvent drum 112 or 212 is also used with the phase separation zones, portions 108*c* or 208*c* can comprise about 1, 10, 30, 50 or 70 V % of stream 108 or 208, and stream 186 or 286 from solvent drum 112 or 212 can comprise about 1, 10, 30, 50 or 70 V % of stream 114 or 214.

In general, spent adsorbent material and/or desorbed contaminants from adsorptive demetallizing zone 180, 280 are removed via line 182, 282. This spent adsorbent material is mixed in an asphalt pool 190, 290 along with asphalt streams 152, 252. Therefore, by removal of the contaminants and spent adsorbent material overall process efficiency is realized.

In certain embodiments, plural fixed beds can be provided as adsorptive demetallizing zone 180, 280 in a swing mode. In operation, DAO from secondary phase separation zone 130 or phase separation zone 220 is passed through one of the beds while the other is being desorbed. When the adsorbent material is spent in one of the adsorption towers due to blockage of the adsorption sites by the undesired metals, DAO stream 124 or 224 can be directed to the other tower, while the adsorbent material in the spent tower is desorbed.

Figure 4B:
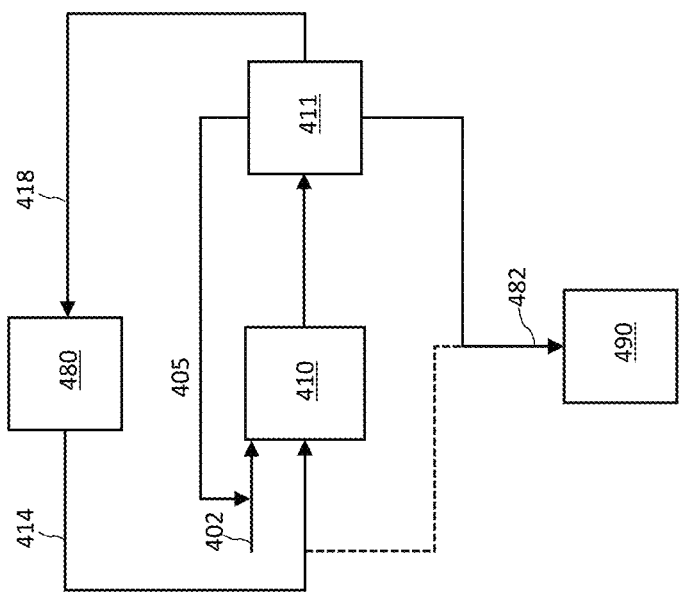
FIG. 4B is a process flow diagram of another embodiment of an adsorptive demetallizing zone of the enhanced SDA/DM processes and systems herein, and corresponding desorption process flow.
Figure 4A:
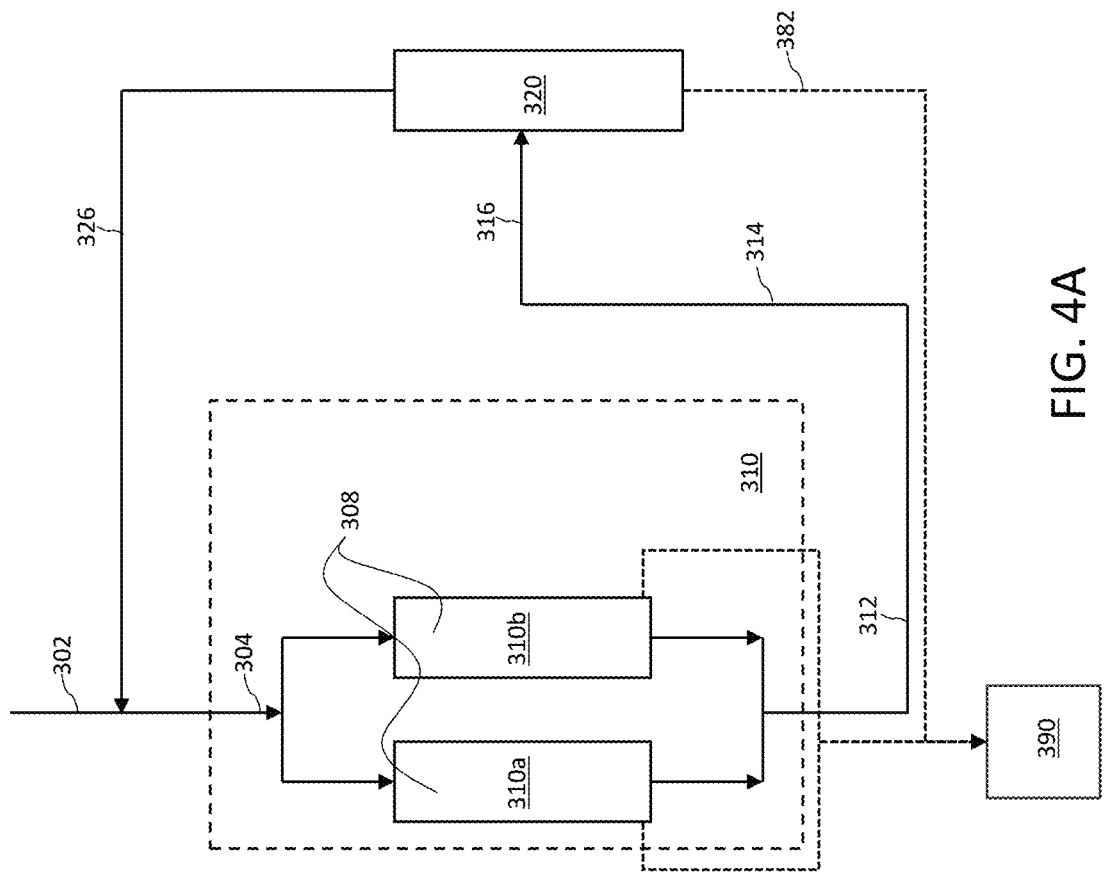
FIG. 4A is a process flow diagram of an embodiment of a fixed bed adsorptive demetallizing zone of the enhanced SDA/DM processes and systems herein, and corresponding desorption process flow.

In one example, with reference to FIG. 4A, two packed columns 310a and 310b are gravity fed or pressure force-fed sequentially in order to permit continuous operation when one bed is being regenerated. When adsorbent material 308 in column 310a or 310b loses efficacy for adsorption of the targeted metal-containing compounds, the flow of the combined feedstream is directed to the other column (not shown). The adsorbent capacity is regenerated by desorbing a portion of the adsorbed compounds, for instance, by heat or solvent treatment. In the case of heat desorption, heat is applied, for instance, with an inert gas flow such as nitrogen to adsorptive demetallizing zone 310. The desorbed compounds are removed from the adsorption columns 310a, 310b via a suitable outlet, and can passed to the asphalt pool 390, or used in other refinery processes such as residue upgrading facilities including hydroprocessing or coking. In certain embodiments, using the swing-mode arrangement of FIG. 4A, the steps of contacting the mixture of deasphalted oil and paraffinic solvent with adsorptive material, and desorption step(s), are carried out simultaneously.

With continued reference to FIG. 4A, an example of a process flow for solvent desorption is shown. A solvent inlet 304 of adsorptive demetallizing zone 310 is in fluid communication with a source of solvent via a make-up solvent conduit 302 and recycled solvent via a conduit 326. Adsorptive demetallizing zone 310 further includes an outlet 312 in fluid communication with an inlet 316 of a desorption fractionating zone 320 via a conduit 314. A solvent outlet of desorption fractionating zone 320 is in fluid communication with the adsorptive demetallizing zone inlet 304 via a conduit 326, and a bottoms outlet 382 is provided to discharge the desorbed compounds, which can be passed to the asphalt pool 390. In operation, solvent (make-up solvent 302 and/or recycle solvent 326) is introduced to the adsorptive demetallizing zone 310 via inlet 304. The solvent stream containing desorbed compounds is discharged from adsorptive demetallizing zone 310 via conduit 314 to inlet 316 of fractionation unit 320. The recovered solvent stream is recycled back to adsorptive demetallizing zone 310 via conduit 326. The bottoms stream 382 from the fractionation unit 320 contains the adsorbed compounds including the targeted metalloporphyrins, along with asphaltenes and heavy poly nuclear aromatic compounds (for example containing five or more aromatic rings) with and without sulfur and nitrogen heteroatom content. This stream 382, which is similar to streams 182, 282, is blended with asphalt pool 390.

Furthermore, periodically, after a certain number of adsorption-desorption cycles, the adsorbent material 308 in column 310a or 310b loses efficacy, and operations are no longer effective even when that adsorbent material is regenerated, spent adsorbent material is passed to asphalt pool 390. In certain embodiments, the spent adsorbent material is discharged and integrated with the asphalt pool 390 sooner than that point, so that the partially spent adsorbent material more effectively binds with the asphaltenes and other components in the asphalt pool. For instance, when the material has reached about 50 W % capacity, it can be blended with the asphalt pool 390 and be effectively integrated.

Referring to FIG. 4B, an embodiment of a side-stream desorption process is shown. Adsorbed material, for instance, from a fluidized adsorptive demetallizing zone 480, is passed to a mixing unit 410 along with an effective quantity of recycle solvent 405 and optionally make-up solvent 402. The fluidized mixture is passed to a separation zone 411 to recover solvent 405, cleaned adsorbent material 418 that is recycled to the adsorptive demetallizing zone 480, and desorbed contaminants 482. Separation zone can comprise one or more filtration and/or fractionation units to effectively separate the cleaned adsorbent material, solvent and the desorbed contaminants. The bottoms stream 482 from the separation zone 411 contains the adsorbed compounds including the targeted metalloporphyrins, along with asphaltenes and heavy poly nuclear aromatic compounds (for example containing five or more aromatic rings) with and without sulfur and nitrogen heteroatom content. This stream 482, which is similar to streams 182, 282, is blended with asphalt pool 490.

Furthermore, periodically, after a certain number of adsorption-desorption cycles, the adsorbent material loses efficacy, and operations are no longer effective even when that adsorbent material is regenerated, spent adsorbent material can be drawn off from stream 414 and passed to asphalt pool 490. In certain embodiments, the spent adsorbent material is discharged and integrated with the asphalt pool 490 sooner than that point, so that the partially spent adsorbent material more effectively binds with the asphaltenes and other components in the asphalt pool. For instance, when the material has reached about 50% capacity, it can be blended with the asphalt pool 490 and be effectively integrated.

While not shown, the skilled artisan will understand that additional equipment, including exchangers, furnaces, pumps, columns, and compressors to feed the reactors, maintain proper operating conditions, and to separate reaction products, are all part of the systems described.

Example

A vacuum residue from Arab light crude oil is demetallized in a DEMEX unit using a mixture of butanes as a solvent having a composition of 10.1 mol % iC4, 86.8 mol % nC4, 2.6 mol % iC5 and 0.5 mol % nC5. The solvent deasphalting yields and product properties are given in Table 2.

TABLE 2

Yields and properties of DEMEX unit feedstock and products

| Properties | Unit | Vacuum Residue | DMO | Asphalt |
|---|---|---|---|---|
| Yields | V % | 100 | 70 | 30 |
| API Gravity | — | 8.3 | 14.2 | −3.9 |
| Specific Gravity | — | 1.0125 | 0.9711 | 1.1091 |
| Sulfur | W % | 4.00 | 3.45 | 5.12 |
| Nitrogen | W % | 0.34 | 0.20 | 0.64 |
| CCR | W % | 16 | 8 | 32 |
| C7 Insolubles | W % | 7.5 | 0.05 | 23 |
| Viscosity @ 98.9° C. | cSt | 990 | 140 | 8.50E+05 |
| Softening Point | ° C. | — | — | 121 |
| Ni | Ppmw | 32 | 2 | 54 |
| V | Ppmw | 19 | 4 | 89 |
| Total | Ppmw | 51 | 6 | 143 |

Attapulgus clay with 108 m$^2$/g surface area and 0.392 cm$^3$/g pore volume was loaded in an adsorption column and used as an adsorbent to remove the metal in a demetallized oil stream. The DMO contained 85.2 W % carbon, 11.8 W % hydrogen, 3.5 W % sulfur and 2000 ppmw nitrogen, 8 W % MCR. The mid-boiling point of the DMO stream was 614° C. as measured by ASTM D-2887 method. The demetallized oil is mixed with a straight run naphtha stream boiling in the range of 36-180° C. containing 97 W % paraffins, the remainder being aromatics and naphthenes, at 1:10 ratio (V % DMO to V % naphtha). The mixture was passed to the adsorptive demetallization zone, an adsorption column containing Attapulgus clay, operating with a contact time of 30 minutes and at 20° C. The naphtha fraction was distilled off and 94.7 W % of demetallized DMO was collected. The adsorptive treatment reduced the total metal content to less than 0.5 ppmw.

The method and system of the present invention have been described above and in the attached drawings; however, modifications will be apparent to those of ordinary skill in the art and the scope of protection for the invention is to be defined by the claims that follow.

The invention claimed is:

1. A process to treat a heavy feedstock to reduce the content of undesired metal components comprising:
   a. mixing the feedstock with an effective quantity of paraffinic solvent;
   b. separating asphaltic content;
   c. recovering a mixture of deasphalted oil and paraffinic solvent;
   d. contacting the mixture of deasphalted oil and paraffinic solvent in an adsorptive demetallizing zone selected from the group consisting of a fixed bed and a fluidized bed, the adsorptive demetallizing zone containing an effective quantity of solid adsorbent, the contacting occurring under conditions and for a time sufficient for adsorption of the undesired metal components; and
   e. recovering a mixture of deeply demetallized oil and paraffinic solvent.

2. The process as in claim 1, wherein the paraffin solvent comprises C3-C11 hydrocarbons.

3. The process as in claim 1, wherein the paraffin solvent comprises C3-C9 hydrocarbons.

4. The process as in claim 1, wherein the paraffin solvent comprises C3-C7 hydrocarbons.

5. The process as in claim 1, wherein the heavy feedstock and the paraffinic solvent are derived from an initial feedstock, and wherein the paraffinic solvent comprises C5-C11, C5-C9 or C5-C7 naphtha.

6. The process as in claim 1, further comprising:
   f. separating paraffinic solvent and recovering deeply demetallized oil.

7. The process as in claim 6, further comprising:
   g. recycling separating paraffinic solvent to step (a).

8. The process as in claim 6, further comprising:
   g. contacting spent or partially spent adsorbent with heated inert gas for desorption to reduce asphaltenic and metal content of the adsorbent, and
   h. using the adsorbent subjected to desorption in step (g) in the contacting step (d).

9. The process as in claim 6, further comprising:
   g. mixing solvent with spent or partially spent adsorbent for desorption to reduce asphaltenic and metal content of the adsorptive material, and
   h. using the adsorbent subjected to desorption in step (g) in the contacting step (d).

10. The process as in claim 9, wherein the solvent in step (g) is polar solvent.

11. The process as in claim 9, wherein the solvent in step (g) is paraffinic solvent.

12. The process as in claim 11, wherein the source of paraffinic solvent for step (g) is the same source of paraffinic solvent for step (a).

13. The process as in claim 9, further comprising combining asphaltic content separated in step (b) with asphaltenic and metal content desorbed in step (g).

14. The process as in claim 9, wherein the adsorptive demetallizing zone comprises one or more fixed beds.

15. The process as in claim 14, wherein at least two fixed beds are provided, steps (d) and (g) occur simultaneously, step (d) occurs in a first of the at least two fixed beds, and step (g) occurs in a second of the at least two fixed beds.

16. The process as in claim 9, wherein the adsorptive demetallizing zone comprises a fluidized bed.

17. The process as in claim 1, wherein steps (a)-(c) occur in a phase separation zone.

18. The process as in claim 1, wherein steps (a)-(c) occur in a primary phase separation zone and a secondary phase separation zone, wherein:
   the feedstock and solvent are passed to the primary phase separation zone for separation by solvent extraction into a primary deasphalted oil phase and a primary asphalt phase; and
   the primary deasphalted oil phase is passed to the secondary phase separation zone for separation by solvent extraction into a secondary deasphalted oil phase and a secondary asphalt phase,
   wherein the secondary deasphalted oil phase is the mixture recovered in step (c) and wherein the primary asphalt phase and the secondary asphalt phase is the asphaltic content separated in step (b).

19. A solvent deasphalting process for upgrading a heavy feedstock containing undesirable metal components comprising:
   contacting the heavy feedstock with an effective quantity of solvent to promote phase separation, to produce an asphalt phase and a reduced asphalt content phase;
   contacting the reduced asphalt content phase in an adsorptive demetallizing zone selected from the group consisting of a fixed bed and a fluidized bed, the adsorptive demetallizing zone containing an effective quantity of solid adsorbent, the contacting occurring under conditions and for a time sufficient to adsorb undesirable metal components to produce an oil phase substantially-free of asphalt and substantially-free of metal;
   subjecting the asphalt phase to flash separation to produce an asphalt effluent and solvent phase;
   recovering the asphalt effluent;
   recycling the solvent phase;
   subjecting the oil phase substantially-free of asphalt and substantially-free of metal to flash separation to produce a solvent fraction and an oil phase effluent substantially-free of asphalt and substantially-free of metal;
   recycling the solvent fraction; and
   recovering the oil phase effluent substantially free of asphalt and substantially free of metal.

20. A solvent deasphalting system for upgrading a heavy feedstock containing undesirable metal components comprising:
   a phase separation zone having one or more inlets in fluid communication with a source of the heavy feedstock and with a source of solvent to promote phase separation, one or more outlets for discharging an asphalt phase containing asphalt and solvent, and one or more outlets for discharging a deasphalted oil phase containing deasphalted oil and solvent;
   an adsorptive demetallizing zone selected from the group consisting of a fixed bed and a fluidized bed, the adsorptive demetallizing zone containing an effective amount of solid adsorbent, including one or more inlets in fluid communication with the outlet of phase separation zone discharging the deasphalted oil phase, and one or more outlets for discharging a stream of demetallized/deasphalted oil and solvent, wherein the deasphalted oil phase contacts the solid adsorbent under conditions and for a time sufficient for adsorption of the undesired metal components; and a demetallized/deasphalted oil and solvent separation zone having one or more inlets in fluid communication with the outlet of the adsorptive demetallizing zone for discharging the stream of demetallized/deasphalted oil and solvent, one or more outlets for discharging demetallized/deasphalted oil, and one or more outlets for discharging solvent.

* * * * *